(12) United States Patent
Salunkhe et al.

(10) Patent No.: US 11,255,571 B2
(45) Date of Patent: Feb. 22, 2022

(54) LIQUID LEVEL SENSOR MOUNTING SYSTEMS AND METHODS

(71) Applicant: Johnson Controls Technology Company, Auburn Hills, MI (US)

(72) Inventors: Ravindra B. Salunkhe, Satara (IN); Siddappa R. Bidari, Pune (IN); Praveen Y R, Davanagere (IN); Kunal J. Gandevia, Pune (IN)

(73) Assignee: Johnson Controls Technology Company, Auburn Hills, MI (US)

( * ) Notice: Subject to any disclaimer, the term of this patent is extended or adjusted under 35 U.S.C. 154(b) by 81 days.

(21) Appl. No.: 16/136,040

(22) Filed: Sep. 19, 2018

(65) Prior Publication Data

US 2020/0088442 A1 Mar. 19, 2020

Related U.S. Application Data

(60) Provisional application No. 62/732,963, filed on Sep. 18, 2018.

(51) Int. Cl.
*F24F 13/22* (2006.01)
*G01F 23/76* (2006.01)
*H01H 35/18* (2006.01)
*H01H 9/02* (2006.01)
*F24F 11/88* (2018.01)

(52) U.S. Cl.
CPC ............ *F24F 13/222* (2013.01); *F24F 11/88* (2018.01); *G01F 23/76* (2013.01); *H01H 35/18* (2013.01); *H01H 9/0207* (2013.01)

(58) Field of Classification Search
CPC ..... F24F 11/88; F24F 13/222; G01F 23/0007; G01F 23/74; G01F 23/76; H01H 35/18; H01H 36/0006; H01H 36/02; H01H 9/0207
USPC .. 248/200, 550, 220.21, 220.2, 274.1, 276.1
See application file for complete search history.

(56) References Cited

U.S. PATENT DOCUMENTS

| | | | | |
|---|---|---|---|---|
| 462,265 | A * | 11/1891 | Mason ................... | A01K 97/10 248/515 |
| 1,589,378 | A * | 6/1926 | Erkins ...................... | B60R 1/04 248/487 |
| 2,541,434 | A * | 2/1951 | Nelson ...................... | E06C 7/14 248/210 |
| 2,920,853 | A * | 1/1960 | Bufogle .................... | E03D 1/33 248/214 |
| 3,154,683 | A * | 10/1964 | Blair ....................... | A61B 6/501 378/180 |
| 5,022,233 | A * | 6/1991 | Kirschner ............ | B67D 1/0864 62/138 |
| 6,362,742 | B1 | 3/2002 | Serenil, Jr. | |

(Continued)

*Primary Examiner* — Christopher R Zerphey
(74) *Attorney, Agent, or Firm* — Fletcher Yoder, P.C.

(57) ABSTRACT

In an embodiment of the present disclosure, a condensate level switch mounting assembly includes a condensate level switch having a mounting frame, a first bracket configured to fixedly attach to a condensate drain pan, and a second bracket having a mounting plate configured to engage with the mounting frame of the condensate level switch to secure the condensate level switch to the second bracket. The condensate level switch mounting assembly further includes a fastener assembly configured to couple the second bracket to the first bracket such that an angular position of the second bracket is adjustable relative to the first bracket.

11 Claims, 7 Drawing Sheets

(56) References Cited

U.S. PATENT DOCUMENTS

| | | |
|---|---|---|
| 7,067,749 B1 | 6/2006 | Cantolino |
| 7,521,639 B1 | 4/2009 | Ward |
| 7,967,267 B1 | 6/2011 | Cantolino |
| 9,249,981 B2 | 2/2016 | Sada et al. |
| 9,423,148 B2 * | 8/2016 | Oakner ................ F24F 13/222 |
| 2002/0145209 A1 * | 10/2002 | Litz .......................... F28D 5/00 261/26 |
| 2005/0166613 A1 | 8/2005 | Oakner et al. |
| 2012/0158188 A1 | 6/2012 | Madala |
| 2014/0008253 A1 | 1/2014 | Cantolino et al. |

* cited by examiner

LIQUID LEVEL SENSOR MOUNTING SYSTEMS AND METHODS

CROSS REFERENCE TO RELATED APPLICATIONS

This application claims priority from and the benefit of U.S. Provisional Application Ser. No. 62/732,963, entitled "LIQUID LEVEL SENSOR MOUNTING SYSTEMS AND METHODS," filed Sep. 18, 2018, which is hereby incorporated by reference in its entirety for all purposes.

BACKGROUND

The present disclosure relates generally to heating, ventilation, and/or air conditioning (HVAC) systems and, more particularly, to systems and methods for a mounting system for a liquid level sensor.

A wide range of applications exist for HVAC systems. For example, residential, light commercial, commercial, and industrial systems are used to control temperatures and air quality in indoor environments and buildings. Generally, HVAC units may include a heat exchanger configured to flow chilled refrigerant through coils while air is passed over the coils in order to provide cooled air to a building. As the air is cooled, moisture in the air may condense and gather about the coils. The condensed moisture, or condensate, may then fall into a drain pan disposed below the coils. As the condensate continues to fall into the drain pan, a liquid level within the drain pan may rise. In some instances, a sensor may be utilized to detect the liquid level within the drain pan.

SUMMARY

In one embodiment of the present disclosure, a condensate level switch mounting assembly includes a condensate level switch having a mounting frame, a first bracket configured to fixedly attach to a condensate drain pan, and a second bracket having a mounting plate configured to engage with the mounting frame of the condensate level switch to secure the condensate level switch to the second bracket. The condensate level switch mounting assembly further includes a fastener assembly configured to couple the second bracket to the first bracket such that an angular position of the second bracket is adjustable relative to the first bracket.

In another embodiment of the present disclosure, a retrofit mounting assembly for a liquid level sensor includes a stationary bracket configured to couple to an existing liquid level sensor mounting location of a drain pan and an adjustable bracket configured to be coupled to the stationary bracket. The adjustable bracket is configured to support the liquid level sensor. The retrofit mounting assembly further includes a coupling between the stationary bracket and the adjustable bracket that facilitates independent adjustment of each of a linear position and an angular position of the adjustable bracket relative to the stationary bracket.

In a further embodiment of the present disclosure, a heating, ventilation, and/or air conditioning (HVAC) assembly includes a drain pan configured to collect condensate in an HVAC system, a mounting assembly configured to couple to the drain pan and to support a liquid level sensor adjacent to the drain pan via a mounting frame of the liquid level sensor. The HVAC assembly further includes a first bracket of the mounting assembly configured to be mounted to the drain pan, and a second bracket of the mounting assembly comprising a mounting plate configured to engage with the mounting frame of the liquid sensor. The second bracket is configured to couple to the first bracket such that a position of the second bracket relative to the first bracket is adjustable between a plurality of orientations.

Other features and advantages of the present application will be apparent from the following, more detailed description of the embodiments, taken in conjunction with the accompanying drawings, which illustrate, by way of example, the principles of the application.

DETAILED DESCRIPTION

Certain heating, ventilation, and/or air conditioning (HVAC) units may include a drain pan positioned to collect condensate that forms on a heat exchanger, such as an evaporator. Such HVAC units may further include a liquid level sensor, such as a condensate level switch, coupled to the drain pan and configured to detect a liquid level of the condensate within the drain pan. In certain instances, the liquid level sensor should be mounted in a particular orientation and elevation to properly function and detect the level of the condensate within the drain pan. Accordingly, liquid level sensors may be coupled to the drain pan using complicated mounting systems to enable proper positioning of the liquid level sensor relative to the drain pan and the condensate within the drain pan. Moreover, the complicated mounting systems may be designed to mount the liquid level sensor to only certain drain pan geometries. Further, such mounting systems may cause challenges in accessibility for mounting and servicing the liquid level sensor.

Accordingly, the present disclosure is directed to an improved mounting assembly for a liquid level sensor in an HVAC system. Generally, the mounting assembly enables linear and angular adjustment of the liquid level sensor relative to the drain pan. In this manner, the mounting assembly is configured to mount the liquid level sensor to a variety of different drain pan geometries. Particularly, the mounting assembly may include a stationary bracket configured to couple to the drain pan and an adjustable bracket configured to couple to the stationary bracket and to support the liquid level sensor. The adjustable bracket is configured to be easily adjusted angularly and linearly relative to the stationary bracket to adjust the position of the liquid level sensor relative to the drain pan and condensate within the drain pan. Moreover, the mounting assembly may include visual adjustment indicators. The adjustment indicators may be utilized to determine an exact position and orientation of the adjustable bracket relative to the stationary bracket for precise mounting of the liquid level sensor on the drain pan.

Figure 1:
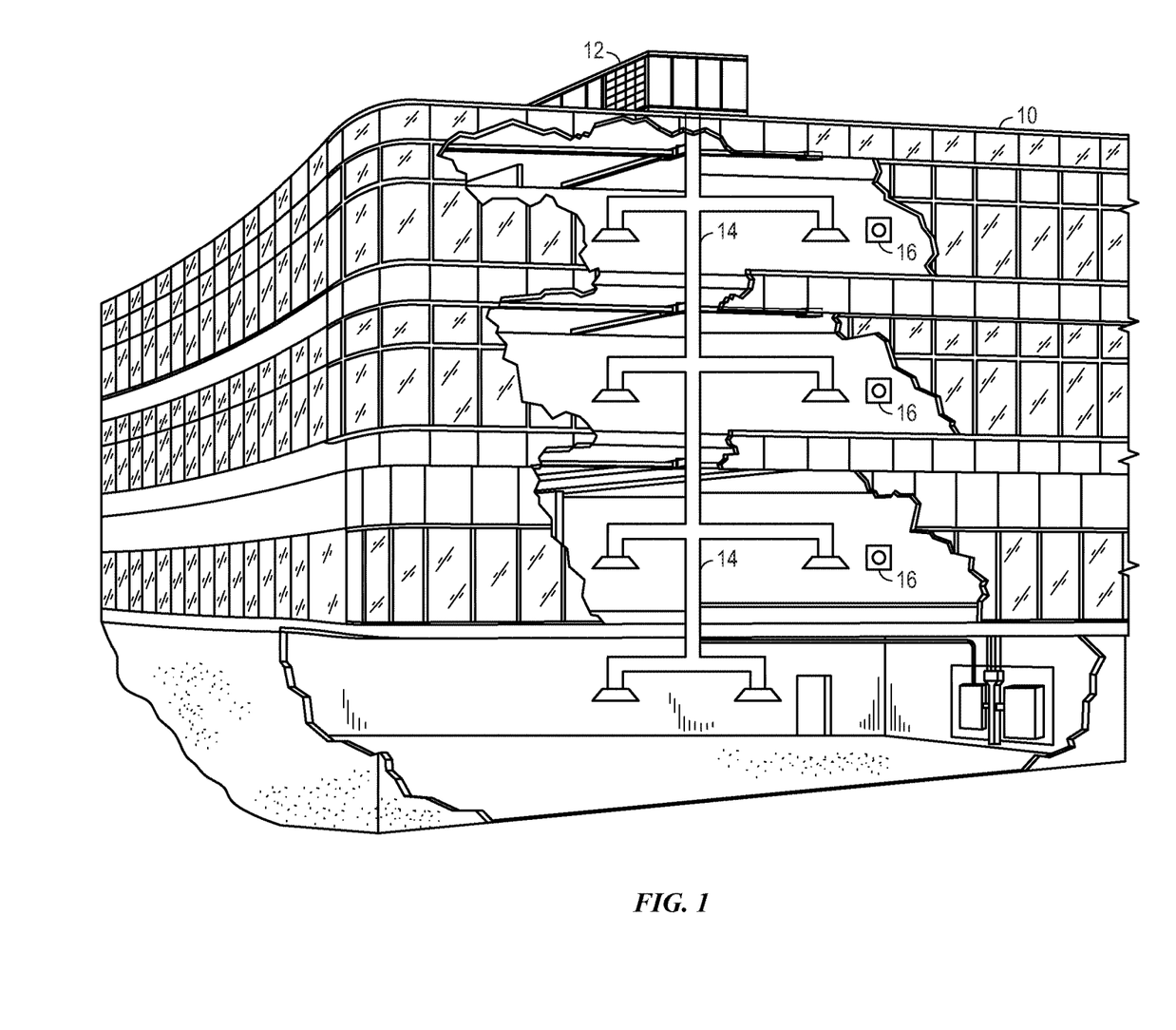
FIG. 1 is a perspective view of an embodiment of a heating, ventilation, and/or air conditioning (HVAC) system for building environmental management that may employ one or more HVAC units, in accordance with aspects of the present disclosure.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56. The HVAC unit 12 is an air cooled device that implements a refrigeration cycle to provide conditioned air to the building 10. Specifically, the HVAC unit 12 may include one or more heat exchangers across which an airflow is passed to condition the airflow before the airflow is supplied to the building. In the illustrated embodiment, the HVAC unit 12 is a rooftop unit (RTU) that conditions a supply air stream, such as environmental air and/or a return airflow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
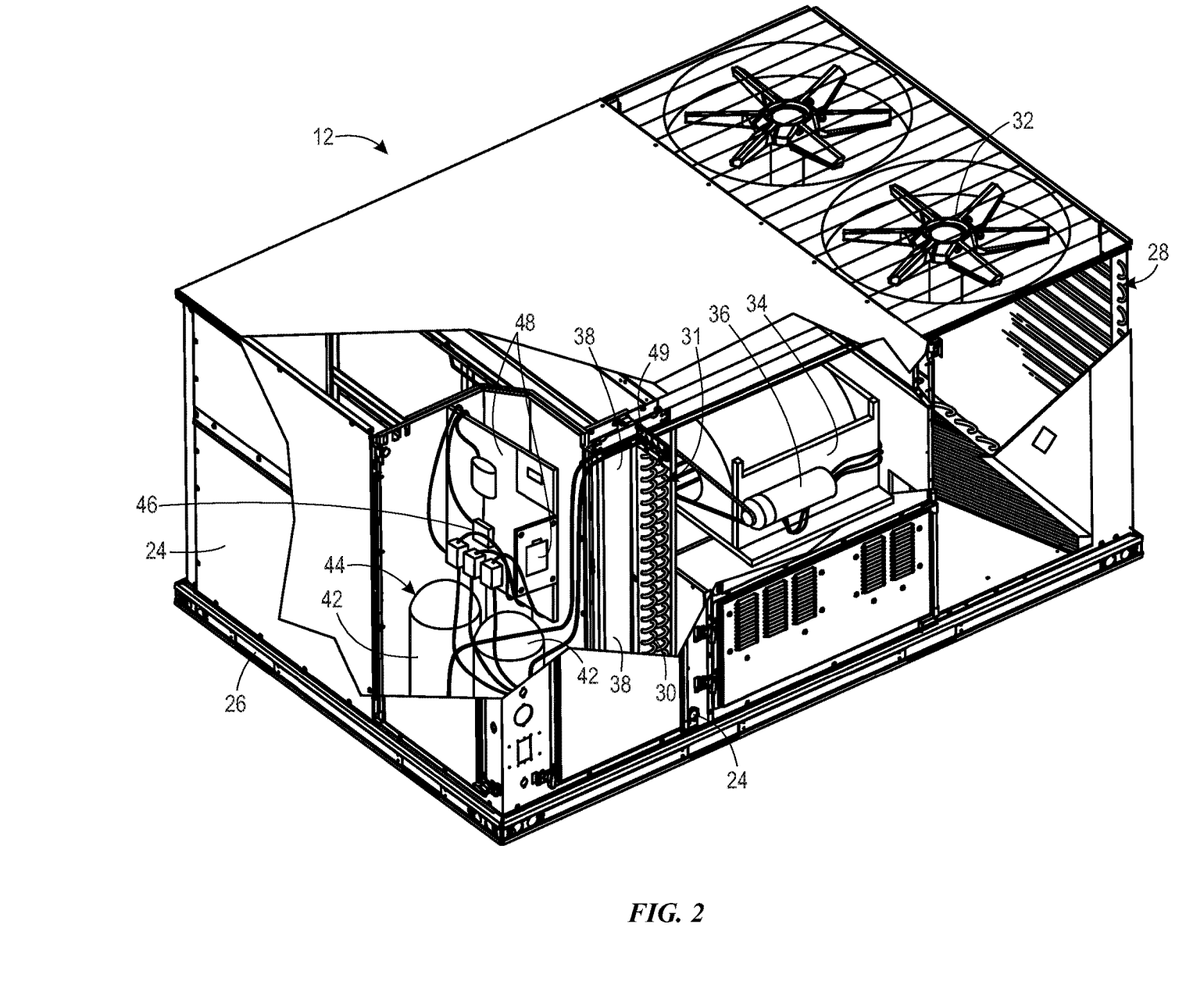
FIG. 2 is a perspective view of an embodiment of an HVAC unit, in accordance with aspects of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant (for example, R-410A, steam, or water) through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the airflows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned airflows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms (one or more being referred to herein separately or collectively as the control device 16). The control circuitry may be configured to control operation of the equipment, provide alarms, and monitor safety switches. Wiring 49 may connect the control board 48 and the terminal block 46 to the equipment of the HVAC unit 12.

Figure 3:
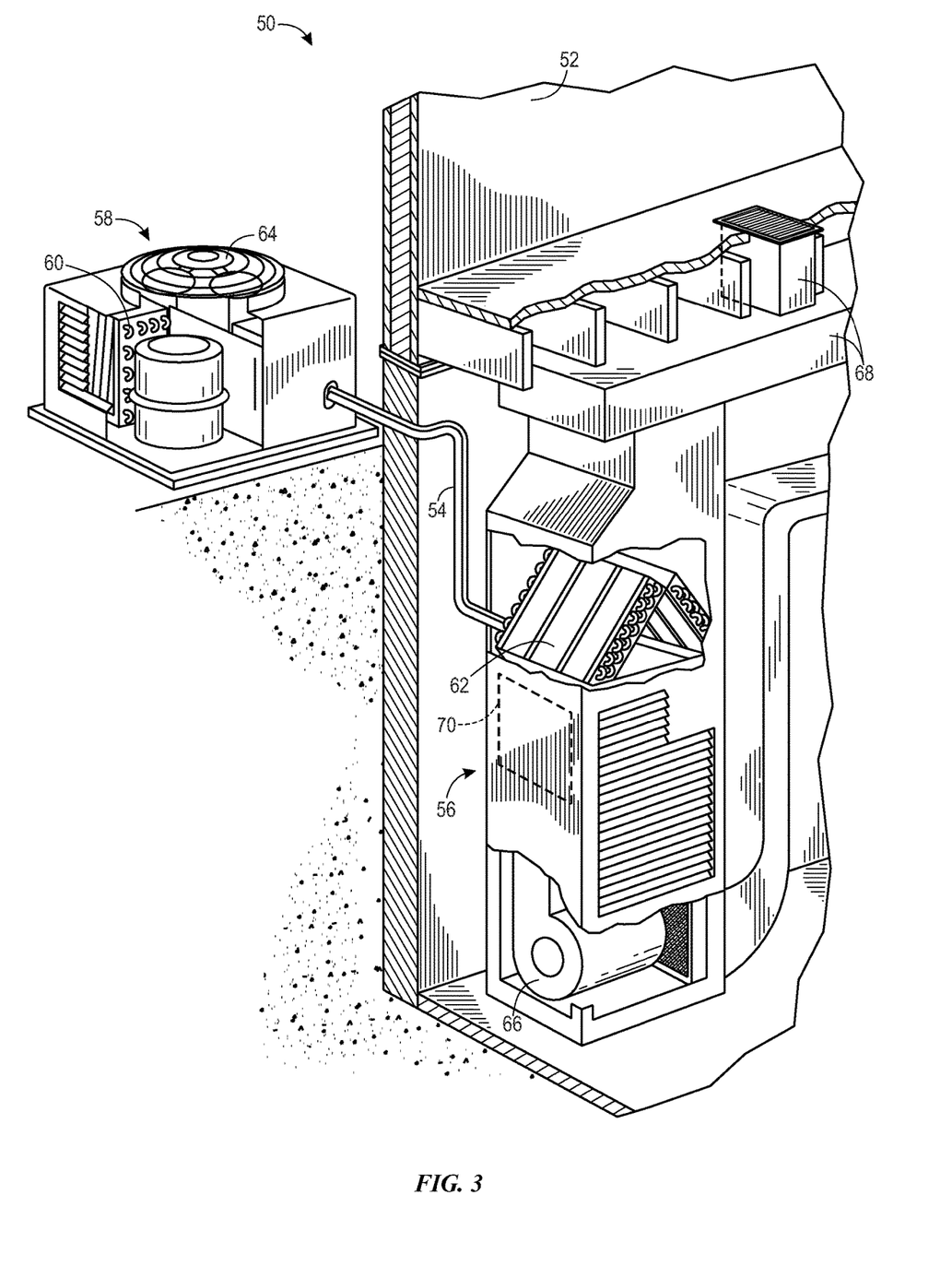
FIG. 3 is a perspective view of an embodiment of a residential split heating and cooling system, in accordance with aspects of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant (which may be expanded by an expansion device, not shown) and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat (plus a small amount), the residential heating and cooling system 50 may become operative to refrigerate additional air for circulation through the residence 52. When the temperature reaches the set point (minus a small amount), the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger (that is, separate from heat exchanger 62), such that air directed by the blower 66 passes over the tubes or pipes and extracts heat from the combustion products. The heated air may then be routed from the furnace system 70 to the ductwork 68 for heating the residence 52.

Figure 4:
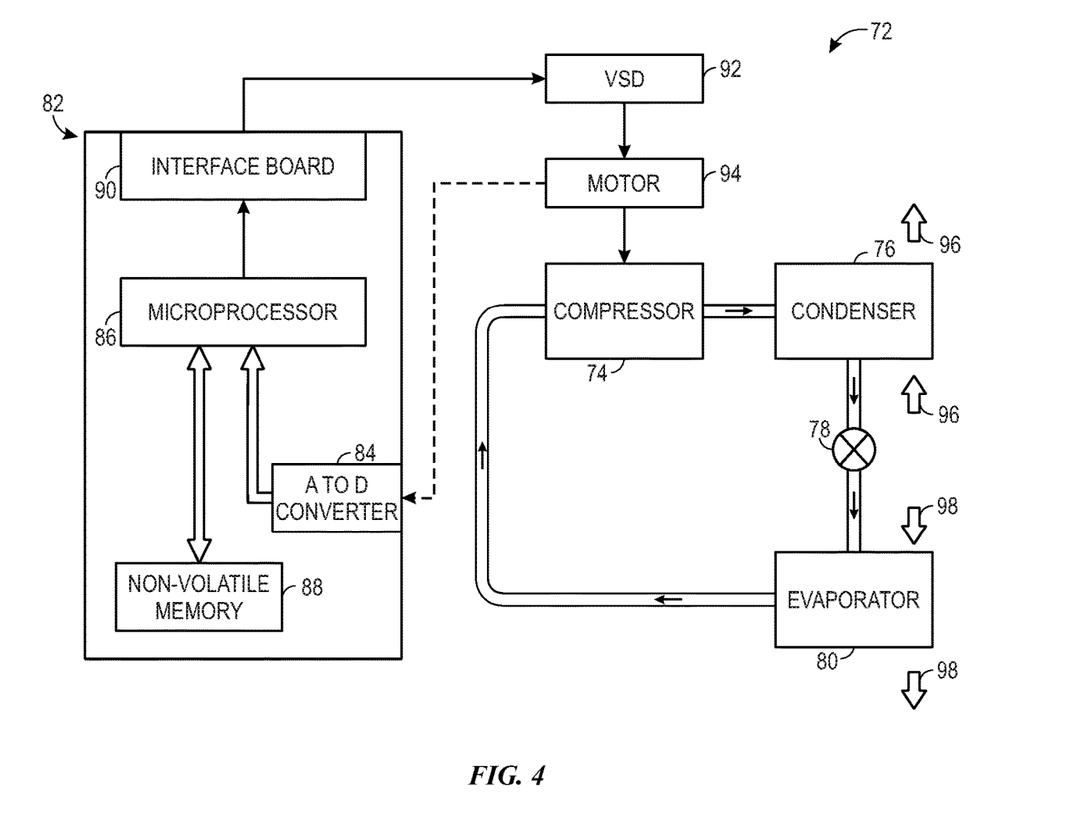
FIG. 4 is a schematic view of an embodiment of a vapor compression system that may be used in an HVAC system, in accordance with aspects of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

As discussed below, an HVAC system 100, such as the HVAC unit 12, the residential heating and cooling system 50, and/or the vapor compression system 72 may include a drain pan 102 configured to collect condensate that falls from evaporator coils 103 of an evaporator heat exchanger 104, such as the heat exchanger 28 or the heat exchanger 60, or other heat exchanger of the HVAC system 100. That is, refrigerant flowing through the evaporator coils 103 may condense moisture in air that is moved over the evaporator coils 103 by an air mover, such as the blower assembly 34 or the fan 66. The condensed moisture may collect on the evaporator coils 103 and fall from the evaporator coils 103 as condensate liquid. In particular, the condensate liquid may fall from the evaporator coils 103 into the drain pan 102 disposed beneath the evaporator coils 103. The HVAC system 100 may further include a liquid level sensor 106, or condensate level switch, coupled to the drain pan 102 via a mounting assembly 108. The mounting assembly 108 may be configured for use with a variety of drain pan geometries. As such, the mounting assembly 108 may be easily adjustable to couple the liquid level sensor 106 to the drain pan 102. In certain applications, the disclosed embodiments of the mounting assembly 108 may be used as a retrofit kit to couple the liquid level sensor 106 with existing drain pans 102.

Figure 5:
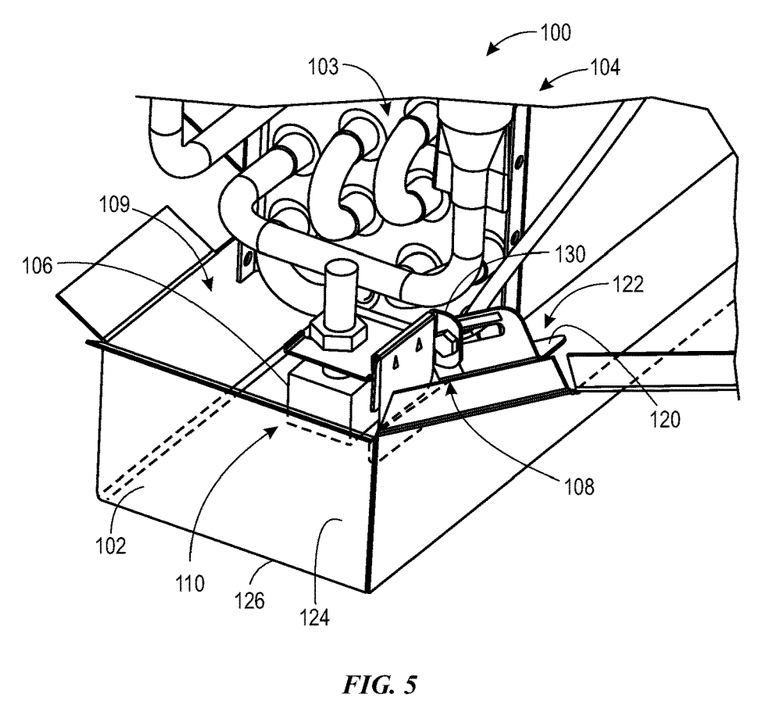
FIG. 5 is a perspective view of an embodiment of a liquid level sensor coupled to a drain pan via a mounting assembly, in accordance with aspects of the present disclosure.

To illustrate, FIG. 5 is a perspective view of the liquid level sensor 106 coupled to the drain pan 102 via the mounting assembly 108. As discussed above, the drain pan 102 is configured to collect condensate that falls from the evaporator coils 103 in a receptacle portion 109 of the drain pan 102. As the drain pan 102 collects the condensate, a liquid level of the condensate within the receptacle portion 109 may rise. The mounting assembly 108 is configured to secure the liquid level sensor 106 in a vertical orientation within the receptacle portion 109 to detect the liquid level of the condensate once the liquid level reaches a threshold level in the drain pan 102. Once the liquid level sensor 106 detects the liquid level of condensate at the threshold level, the liquid level sensor 106 may send one or more signals to a controller, such as the control panel 82, to cause the HVAC system 100 to modify or discontinue operation, such as by discontinuing operation of a compressor, such as the compressor 74. Further, it should be noted that the mounting assembly 108 may be utilized as a part of an HVAC assembly 110, which may be defined as one or more components that may be part of, used in conjunction with, and/or associated with the HVAC system 100.

The mounting assembly 108 is configured to couple the liquid level sensor 106 to a variety of drain pan geometries. To this end, the mounting assembly 108 may include a stationary bracket 120 configured to be rigidly coupled to a mounting portion 122 of the drain pan 102, such as a lip, flange, or wall of the drain pan 102. In some embodiments, the mounting assembly 108 may be mounted to a wall 124 of the receptacle portion 109 of the drain pan 102. Particularly, the receptacle portion 109 of the drain pan 102 may be defined by a base 126 of the drain pan 102 and walls 124 that are configured to contain the condensate therein. The mounting assembly 108 further includes an adjustable bracket 130 configured to couple to the stationary bracket 120 and to support the liquid level sensor 106. Specifically, the adjustable bracket 130 is configured to be adjusted relative to the stationary bracket 120 to adjust a position/orientation of the liquid level sensor 106 held by the adjustable bracket 130. For example, the adjustable bracket 130 is configured to be adjusted to hold the liquid level sensor 106 in a vertical orientation within the receptacle portion 109 of the drain pan 102, as discussed in further detail below.

Figure 6:
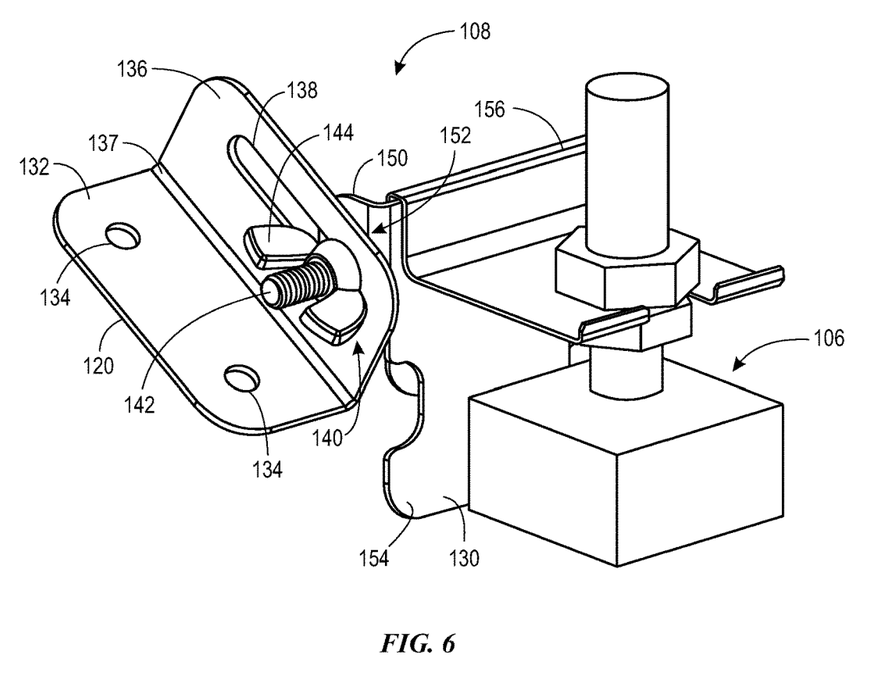
FIG. 6 is a perspective view of an embodiment of a mounting assembly supporting a liquid level sensor, in accordance with aspects of the present disclosure.

FIG. 6 is a perspective view of the mounting assembly 108 coupled to and supporting the liquid level sensor 106. The stationary bracket 120 includes a mounting flange 132 having two mounting apertures 134, or receptacles, extending therethrough. The mounting apertures 134 are configured to receive fasteners, such as screws, bolts, rivets, nails, and so forth, to couple the stationary bracket 120 to the drain pan 102. Keeping this in mind, in some embodiments, the mounting assembly 108 may be used in a retrofit application to mount the liquid level sensor 106 to an existing drain pan, which may have any of a variety of configurations. For example, in certain embodiments, a particular drain pan, such as the drain pan 102, may include one or more existing holes disposed through a flange or wall of the particular drain pan, which are useful for mounting a liquid level sensor. The mounting assembly 108 may utilize the existing one or more holes to couple the stationary bracket 120 to the particular drain pan via the mounting apertures 134. Indeed, the existing one or more holes of the particular drain pan may define an existing condensate level switch mounting location. In certain embodiments, if there is only one existing hole, a second hole may be created, such as by drilling or punching, through the particular drain pan. The first and second holes may then be utilized for mounting the stationary bracket 120 to the particular drain pan. Further, in certain embodiments, the mounting flange 132 may include a single mounting aperture 134. As such, the mounting flange 132 may be mounted to the drain pan 102 via one hole formed in the drain pan 102. In some embodiments, the one hole in the drain pan 102 may be a pre-existing hole designed to be utilized to mount a liquid level sensor.

Further, the stationary bracket 120 includes a positioning flange 136 extending substantially perpendicularly from an edge 137 of the mounting flange 132. The positioning flange 136 includes a slot 138, such as a linear adjustment slot or an extended aperture, or receptacle, extending therethrough. The slot 138 is configured to receive a fastener 140, or fastening assembly, to couple the stationary bracket 120 to the adjustable bracket 130. Particularly, the fastener 140 may include a threaded bolt 142, or screw, and a locking nut 144, such as a wing-nut or thumb nut, as discussed in further detail below. The fastener 140 is configured to couple the positioning flange 136 of the stationary bracket 120 to a rotational flange 150 of the adjustable bracket 130 via a rotational aperture 152, or receptacle, extending through the rotational flange 150. The adjustable bracket 130 further includes a mounting plate 154 configured to support the liquid level sensor 106 via a mounting frame 156 of the liquid level sensor 106.

In some embodiments, the stationary bracket 120, the adjustable bracket 130, the fastener 140, or a combination thereof, may be formed from galvanized steel. Indeed, the mounting assembly 108 may be disposed in a potentially moist or humid environment. As such, the galvanized steel may reduce, block, or prevent corrosion of the mounting assembly 108. Generally, the mounting assembly 108 may be formed from any suitable rigid, corrosion-resistant material.

Figure 7:
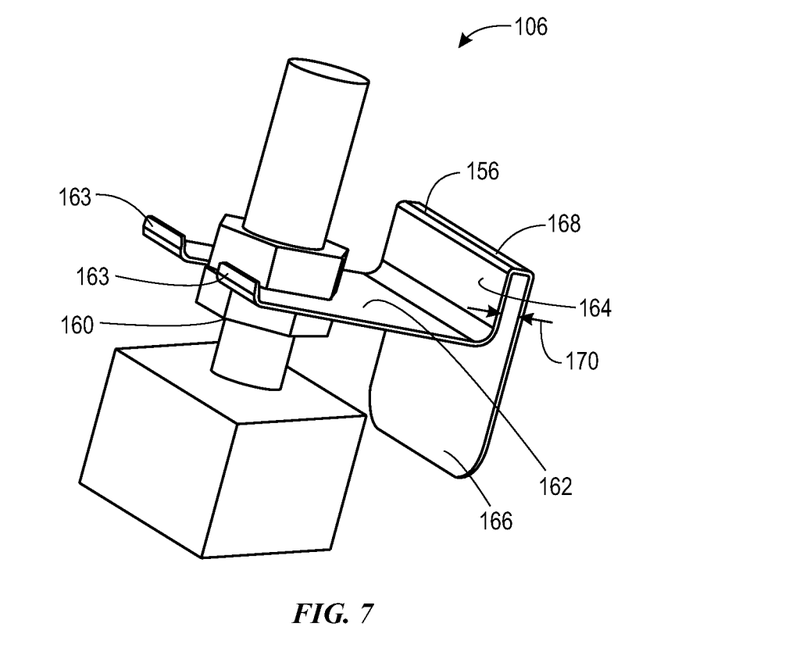
FIG. 7 is a perspective view of an embodiment of a liquid level sensor, in accordance with aspects of the present disclosure.

FIG. 7 is a perspective view of the liquid level sensor 106. The liquid level sensor 106 includes the mounting frame 156 configured to mount onto the mounting plate 154 of the adjustable bracket 130 and to hold and support a sensor portion 160 of the liquid level sensor 106. For example, the mounting frame 156 may include an extension 162 having prongs 163 configured to capture and support the sensor portion 160, as shown. The mounting frame 156 further includes a front flange 164 extending substantially perpendicularly from an edge of the extension 162. The mounting frame 156 further includes a rear flange 166 coupled to the front flange 164 via a top flange 168. In certain embodiments, the front flange 164 and the rear flange 166 may be disposed substantially parallel to each other and may be spaced apart a distance 170 substantially equal to a width of the top flange 168. Specifically, the distance 170 may be substantially equal to or greater than a thickness of the mounting plate 154 of the adjustable bracket 130. Accordingly, the mounting frame 156 of the liquid level sensor 106 may fit over the mounting plate 154. In this way, the mounting plate 154 may be disposed between the front flange 164 and the rear flange 166 and may abut against the top flange 168. In some embodiments, the distance 170 between the front flange 164 and the rear flange 166 may be less than a thickness of the mounting plate 154 of the adjustable bracket 130. In such embodiments, the mounting frame 156 may be configured to flex to fit over the mounting plate 154 such that the mounting frame 156 pinches, or applies a pressure, to the mounting plate 154.

In some embodiments, the liquid level sensor 106 may be a magnetic, liquid-sealed, reed float switch. For example, a portion of the liquid level sensor 106 may rise, or float, in response to a rising liquid level contacting the liquid level sensor 106. The rising portion of the liquid level sensor 106 may cause a reed to interact with a magnet, which may cause the reed to move to close a circuit. When the circuit is closed by the reed, the liquid level sensor 106 sends a signal to control circuitry, such as the control panel 82, to cause the HVAC system 100 to modify or discontinue operation to prevent further condensate from gathering about the coils 103 and falling into the drain pan 102 to further raise the liquid level. Indeed, to operate as intended, the liquid level sensor 106 may be held in a vertical orientation above the base 126 of the drain pan 102, as shown in FIG. 5.

Figure 8:
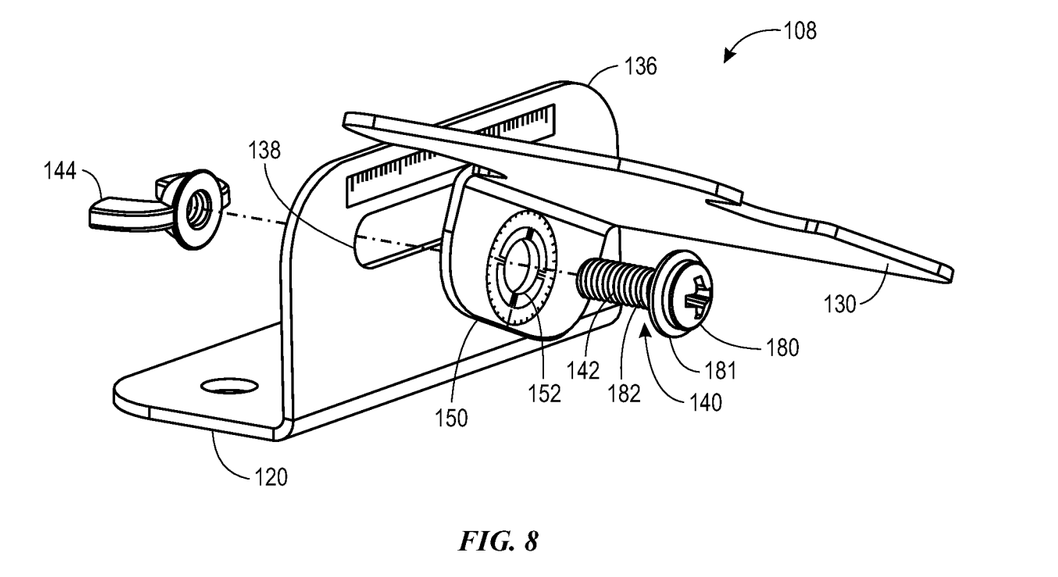
FIG. 8 is a perspective view of an embodiment of a mounting assembly for a liquid level sensor, in accordance with aspects of the present disclosure.

FIG. 8 is an exploded perspective view of an embodiment of the mounting assembly 108. As discussed above, the mounting assembly 108 includes the stationary bracket 120 configured to be coupled to the adjustable bracket 130 via the fastener 140. Specifically, the threaded bolt 142 of the fastener 140 may extend through the rotational aperture 152 of the rotational flange 150 and through the slot 138 of the positioning flange 136. Particularly, the threaded bolt 142 includes a bolt head 180 configured to abut the rotational flange 150 of the adjustable bracket 130 in an assembled position. In some embodiments, the fastener 140 may include a washer 181 disposed between the bolt head 180 and the rotational flange 150 in the assembled position. At the same time, a shaft 182 of the threaded bolt 142 is configured to extend through the rotational aperture 152 and the positioning flange 136 and to engage with the locking nut 144. That is, the locking nut 144 is configured to be torqued to move along the shaft 182 until the locking nut 144 abuts the positioning flange 136 in the assembled position. In this manner, the fastener 140 may hold the adjustable bracket 130 rigidly against the stationary bracket 120 by applying a pressure or force to the rotational flange 150 and the positioning flange 136 via the bolt head 180 and the locking nut 144. Indeed, the locking nut 144 may be loosened or torqued along the threaded bolt 142 and away from the bolt head 180, so that a position of the adjustable bracket 130 relative to the stationary bracket 120 may be adjusted. Further, in some embodiments, the threaded bolt 142 may be a thumb screw. In such embodiments, the threaded bolt 142 may be specifically designed/shaped to be easily gripped and torqued by a human hand. Particularly, the bolt head 180 may be designed to be gripped and torqued by a human hand.

For example, when the locking nut 144 is loosened and the adjustable bracket 130 is movable relative to the stationary bracket 120, the adjustable bracket 130 may be adjusted angularly and linearly relative to the stationary bracket 120. Particularly, the adjustable bracket 130 may be moved along the slot 138 for linear adjustment of the adjustable bracket 130 relative to the stationary bracket 120. During linear adjustment of the adjustable bracket 130, the fastener 140 may move through the slot 138 while the adjustable bracket 130 moves in conjunction with the fastener 140 alongside the slot 138. During angular adjustment of the adjustable bracket 130, the adjustable bracket 130 may be rotated about the fastener 140 and the rotational aperture 152. In certain embodiments, during angular adjustment, the fastener 140 may remain substantially in the same position within the slot 138. In this manner, the adjustable bracket 130 may be linearly adjusted without being angularly adjusted, and may be angularly adjusted without being linearly adjusted. In other words, the angular position of the adjustable bracket 130 relative to the stationary bracket 120 may be independently adjustable from adjustment of the linear position of the adjustable bracket 130 relative to the stationary bracket 120 and vice versa. To this end, the adjustable bracket 130 and the stationary bracket 120 may include visual position/orientation indicators that may be used to determine the linear and angular position of the adjustable bracket 130 relative to the stationary bracket 120.

Figure 9:
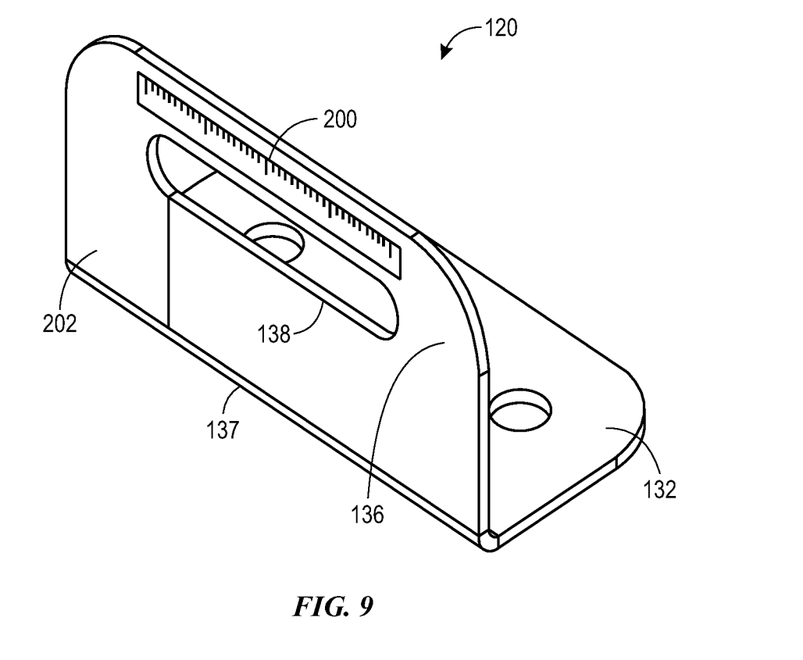
FIG. 9 is a perspective view of an embodiment of a stationary bracket of a mounting assembly for a liquid level sensor, in accordance with aspects of the present disclosure.

To illustrate, FIG. 9 is a perspective view of the stationary bracket 120. The stationary bracket 120 may include a linear measurement indicator 200 disposed along a contact surface 202 of the stationary bracket 120. That is, the contact surface 202 of the stationary bracket 120 is configured to contact the rotational flange 150 of the adjustable bracket 130 when the stationary bracket 120 is coupled to the adjustable bracket 130. The linear measurement indicator 200 may be disposed on the contact surface 202 via etching, adhesives, engraving, inking, and so forth. Generally, the linear measurement indicator 200 may be used to indicate a linear position of the adjustable bracket 130 relative to the stationary bracket 120. In certain embodiments, the linear measurement indicator 200 may include measurement markings indicative of units of length, such as millimeters, centimeters, inches, and so forth. Accordingly, when the adjustable bracket 130 is coupled to the stationary bracket 120 along the contact surface 202 of the positioning flange 136, as discussed above, a position of the adjustable bracket 130 may be visually compared to the linear measurement indicator 200 to indicate a linear position of the adjustable bracket 130 relative to the stationary bracket 120.

Further, as discussed above, the stationary bracket 120 may include the mounting flange 132 and the positioning flange 136. The mounting flange 132 and the positioning flange 136 may be disposed substantially perpendicular relative to each other and are rigidly and integrally formed together along the edge 137. Moreover, the positioning flange 136 may include the slot 138 configured to receive the fastener 140 to couple to the adjustable bracket 130. In certain embodiments, the slot 138 and the linear measurement indicator 200 may extend approximately equal distances along the length of the positioning flange 136. In this manner, every possible position of the adjustable bracket 130, as it is positioned along the slot 138, may be comparable to the linear measurement indicator 200. In certain embodiments, installation instructions for the liquid level sensor 106 on the drain pan 102 may include instructions to place the adjustable bracket 130 at a certain position along the slot 138. The instructions may express the certain position along the slot 138 by indicating a certain location along the linear measurement indicator 200 at which the adjustable bracket 130 is to be positioned.

Figure 10:
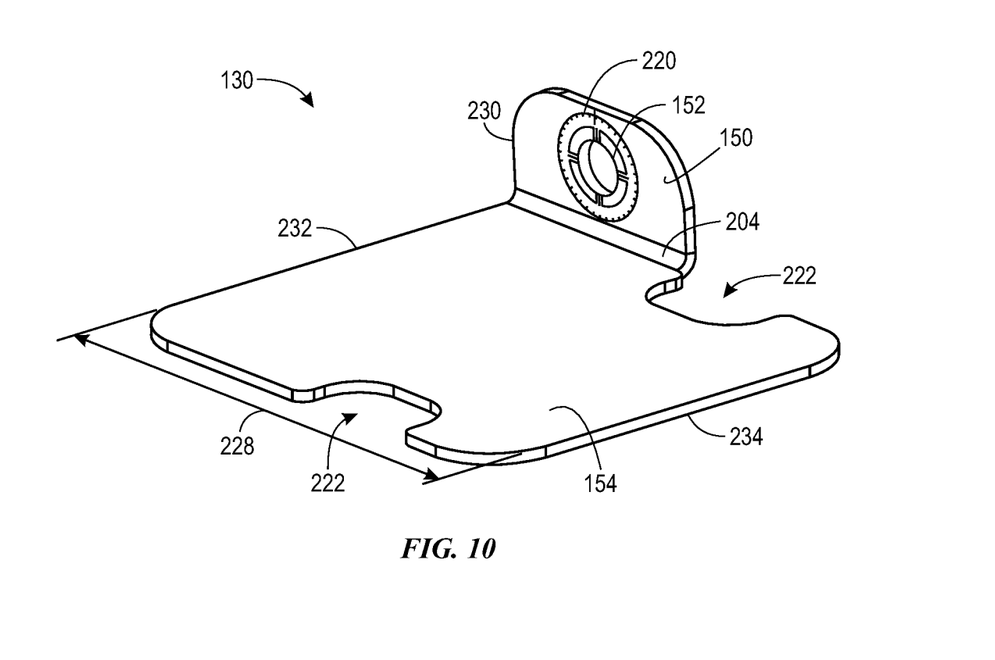
FIG. 10 is a perspective view of an embodiment of an adjustable bracket of a mounting assembly for a liquid level sensor, in accordance with aspects of the present disclosure.

FIG. 10 is a perspective view of the adjustable bracket 130, which includes the mounting plate 154 and the rotational flange 150. In certain embodiments, the mounting plate 154 may be disposed substantially perpendicular relative to the rotational flange 150. Moreover, the rotational flange 150 and the mounting plate 154 are integrally and rigidly formed along an edge 204. As discussed above, the rotational flange 150 is configured to receive the fastener 140 to couple to the stationary bracket 120. Moreover, the rotational flange 150 includes an angular measurement indicator 220 disposed circumferentially about the rotational aperture 152. Similar to the linear measurement indicator 200, the angular measurement indicator 220 may be disposed on the rotational flange 150 via etching, adhesives, engraving, inking, and so forth. Generally, the angular measurement indicator 220 may be used to indicate an angular position of the adjustable bracket 130 relative to the stationary bracket 120. In certain embodiments, the angular measurement indicator 220 may include measurement markings indicative of angular position, such as radians or degrees. In some embodiments, the angular measurement indicator 220 may include a non-standard rotational scale, such as a range of numbers (e.g., 0-10) disposed circumferentially about the rotational aperture 152. Accordingly, when the adjustable bracket 130 is coupled to the stationary bracket 120, the angular position of the adjustable bracket 130 may be determined by visually comparing the angular measurement indicator 220 to the stationary bracket 120. In certain embodiments, installation instructions for the liquid level sensor 106 on the drain pan 102 may include instructions to position the adjustable bracket 130 at a certain orientation relative to the stationary bracket 120. Particularly, the instructions may express the certain orientation, or degree of rotation, of the adjustable bracket 130 by indicating an angular position on the angular measurement indicator 220, which may be determined by comparing the angular measurement indicator 220 to the stationary bracket 120.

Further, as shown, the mounting plate 154 of the adjustable bracket 130 may include a substantially rectangular perimeter with filleted or chamfered corners. Further, as shown, the rectangular perimeter may include cut-outs 222, such as c-shaped cut outs, extending inward from a perimeter of the mounting plate 154. The cut-outs 222 may serve to provide a gripping contour for adjusting the adjustable bracket 130. That is, when adjusting the adjustable bracket 130 relative to the stationary bracket 120, a user may pinch the mounting plate 154 via the gripping contours provided by the cut-outs 222. In this manner, the user may easily grip the mounting plate 154 to adjust the mounting plate 154 to a suitable position. Moreover, the cut-outs 222 of the mounting plate provide a reduction in weight and material of the adjustable bracket 130, thereby reducing shipping and material costs of the mounting assembly 108.

Still further, as shown, the rotational flange 150 of the adjustable bracket 130 may be positioned offset from a center of the mounting plate 154 relative to a length 228 of the rectangular perimeter of the mounting plate 154. Indeed, in certain embodiments, a first edge 230 of the rotational flange 150 may be flush and/or continuous with a second edge 232 of the mounting plate 154. The offset of the rotational flange 150 may provide for elevation variety when mounting the liquid level sensor 106 to the mounting assembly 108 and within the drain pain 102. For example, as shown in FIGS. 5 and 6, the liquid level sensor 106 may be mounted to the second edge 232 of the mounting plate 154. In this way, the liquid level sensor 106 may be mounted at a first mounted elevation relative to the rotational flange 150. However, in some embodiments, the liquid level sensor 106 may be mounted to a third edge 234 of the mounting plate 154 that is opposite the second edge 232. Mounting the liquid level sensor 106 to the third edge 234 would result in a second mounted elevation of the liquid level sensor 106, different from the first mounted elevation relative to the rotational flange 150. Indeed, a position of the mounting plate 154 while the liquid level sensor 106 is mounted on the second edge 232 at the first elevation may be approximately 180 degrees offset from a position of the mounting plate 154 while the liquid level sensor 106 is mounted on the third edge 234. Generally, the offset position of the rotational flange 150 relative to the length 228 of the mounting plate 154 allows the liquid level sensor 106 to be mounted to the second edge 232 with a first, decreased, elevation or to be mounted to the third edge 234 with a second, increased elevation, thereby providing customizable mounting options.

Accordingly, the present disclosure is directed to providing an adjustable mounting assembly for coupling a liquid level sensor to a drain pan. The mounting assembly is configured to mount the liquid level sensor to a variety of drain pan geometries. To this end, the mounting assembly includes a mounting bracket configured to rigidly couple to one or more previously-existing apertures disposed through the drain pan. The mounting assembly further includes an adjustable bracket configured to couple to the mounting bracket at an adjustable position. Particularly, the adjustable bracket is configured to be adjusted angularly and linearly relative to the mounting bracket. The adjustable bracket is further configured to support the liquid level sensor. Accordingly, the mounting assembly is configured to mount the liquid level sensor to a variety of drain pan geometries with simple adjustments to the position of the adjustable bracket.

While only certain features and embodiments of the present disclosure have been illustrated and described, many modifications and changes may occur to those skilled in the art, such as variations in sizes, dimensions, structures, shapes and proportions of the various elements, values of parameters, mounting arrangements, use of materials, orientations, and so forth, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the embodiments, all features of an actual implementation may not have been described, such as those unrelated to the presently contemplated best mode of carrying out the disclosure, or those unrelated to enabling the claimed features. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A heating, ventilation, and/or air conditioning (HVAC) assembly, comprising:
   a drain pan comprising a receptacle configured to collect condensate in an HVAC system, wherein the receptacle comprises a depth;
   a mounting frame of a liquid level sensor;
   a mounting assembly configured to couple to the drain pan and to support the liquid level sensor adjacent to the drain pan via the mounting frame of the liquid level sensor;
   a first bracket of the mounting assembly configured to be mounted to the drain pan; and
   a second bracket of the mounting assembly comprising a mounting plate, wherein the mounting frame of the liquid level sensor is configured to capture the mounting plate of the second bracket, wherein the second bracket is configured to couple to the first bracket such that a position of the second bracket relative to the first bracket is adjustable between a plurality of orientations, wherein the second bracket is rotatable relative to the first bracket and about an axis extending crosswise to the depth of the receptacle, and wherein the mounting plate extends along the depth of the receptacle.

2. The HVAC assembly of claim 1, wherein the first bracket has a first aperture, the second bracket has a second aperture, and the mounting assembly has a fastener configured to extend through the first aperture and the second aperture along the axis to fasten the first bracket to the second bracket.

3. The HVAC assembly of claim 2, wherein the first aperture is a slot, and wherein the second bracket and the fastener are configured to conjunctively move linearly along the slot to adjust the position of the second bracket relative to the first bracket.

4. The HVAC assembly of claim 2, wherein the second bracket is configured to be rotated about the fastener and the second aperture to adjust the position of the second bracket relative to the first bracket.

5. The HVAC assembly of claim 1, wherein the first bracket comprises:
   a mounting flange configured to mount to the drain pan; and
   a positioning flange extending from the mounting flange and configured to couple to the second bracket, wherein the positioning flange comprises a slot, and the mounting assembly comprises a fastener assembly engaged with the slot and the second bracket to facilitate linear and rotational adjustment of the second bracket relative to the first bracket.

6. The HVAC assembly of claim 5, wherein the positioning flange comprises linear measurement indicators positioned on a surface of the positioning flange adjacent to and along a length of the slot.

7. The HVAC assembly of claim 5, wherein the mounting flange comprises a plurality of mounting receptacles configured to receive respective fasteners to fixedly attach the first bracket to the drain pan.

8. The HVAC assembly of claim 5, wherein the second bracket comprises a rotational flange extending from the mounting plate, wherein the rotational flange comprises an aperture, and wherein the fastener assembly extends through the aperture and through the slot to couple the second bracket to the first bracket.

9. The HVAC assembly of claim 8, wherein the rotational flange comprises angular measurement indicators positioned on a surface of the rotational flange adjacent a circumference of the aperture.

10. The HVAC assembly of claim 8, wherein the rotational flange is offset from a center of the mounting plate relative to a length of the mounting plate.

11. The HVAC assembly of claim 8, wherein the fastener assembly comprises:
  a bolt extending through the aperture and the slot; and
  a nut configured to couple to the bolt to secure the second bracket at the position relative to the first bracket and in an orientation of the plurality of orientations.

* * * * *